Feb. 3, 1948.　　F. J. SIGMUND ET AL　　2,435,241
ENVELOPE FOR WINDING ELEMENTS
Filed April 26, 1944
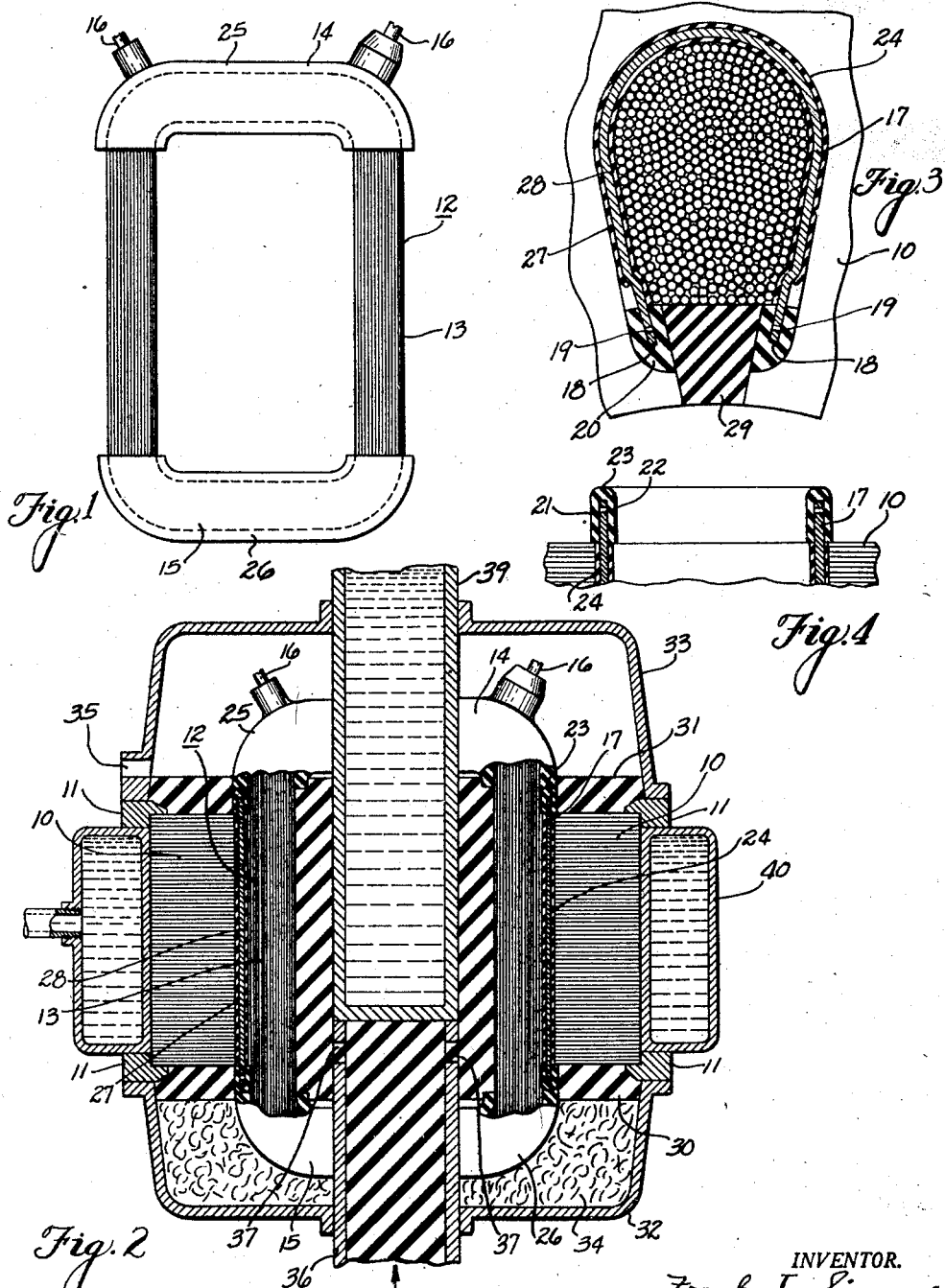

Patented Feb. 3, 1948

2,435,241

UNITED STATES PATENT OFFICE 2,435,241

ENVELOPE FOR WINDING ELEMENTS

Frank J. Sigmund and William S. Hlavin, Cleveland, Ohio, assignors to Sigmund Corporation, a corporation of Ohio Application April 26, 1944, Serial No. 532,746

9 Claims. (Cl. 171—206)

Our invention relates in general to the fluid-proofing of winding elements and more particularly to the fluid-proofing of winding elements for dynamo-electric machines.

An object of our invention is the provision of an envelope for a winding element which is fluid-tight.

Another object of our invention is the provision of fluid-proofing the winding elements in the slots of a magnetizable core and still maintain the maximum slot space for the coil windings.

Another object of our invention is the provision of fluid-proofing the winding elements in the slots of a magnetizable core and still maintain good heat conductivity between the winding elements and the magnetizable core.

Another object of our invention is the provision of fluid-proofing the winding elements in the slots of a magnetizable core by the employment of split metal sleeves having a slit bridged and sealed by insulating material.

Other objects and a fuller understanding of our invention may be had by referring to the following description and claims, taken in conjunction with the accompanying drawing, in which:

Figure 1 represents a side view of a winding element embodying the features of our invention;

Figure 2 is a longitudinal cross-sectional view of a stator of a dynamo-electric machine to which my invention may be applied;

Figure 3 is an enlarged cross-sectional view of a slot of the winding element and the magnetizable core; and Figure 4 is a fragmentary and enlarged view of an end of the metal sleeve employed in my invention and being shown extending beyond the end of a slot in the magnetizable core.

With reference to Figure 2 of the drawing, we are illustrating our invention as being applied to the stator of a dynamo-electric machine, although it is to be understood that our invention applies to the fluid-proofing of winding elements of all kinds. In Figure 2, the stator of the dynamo-electric machine may comprise a magnetizable core 10 which is held together by suitable end rings 11. The magnetizable core is provided with a plurality of open slots 24 to receive the coil sides 13 of the winding element 12. As illustrated, the winding element has a top coil head 14 and a bottom coil head 15. Terminal leads 16 extend from the top coil head 14 and are arranged to be connected to a suitable source of supply. The top and bottom coil heads 14 and 15 are respectively covered with insulating material indicated by the reference characters 25 and 26. The insulating material 25 and 26 may be applied to the coil heads by dipping the coil heads in a suitable preparation of insulating material or molding or otherwise applying the insulating material thereto to render the coil heads fluid-proof. The winding element shown in Figure 1 is a preformed coil and is arranged to be mounted in the magnetizable core after the coil heads have been properly covered with the insulating material 25 and 26. The coil sides 13 are arranged to be made fluid-proof after they are mounted in the slots 24 of the magnetizable core.

Prior to inserting the coil sides 13 in the slots of the magnetizable core, we provide for mounting a split metal sleeve 17 in each of the coil slots. The split metal sleeves are preferably made of non-magnetizable material and have a relatively thin wall section in order not to occupy too much slot space. As shown in Figure 3, the split metal sleeves 17 may be suitably insulated from the wall of the slots of the magnetizable core by insulating material 27 which may constitute a separate piece of insulation, or it may be bonded to the outside surface of the split metal sleeve 17 and may include vitreous materials. The inside surface of the split metal sleeve 17 may be provided with a suitable insulating material 28 which may be made of a separate piece of insulation or which may be bonded to the inside surface thereof and may include vitreous materials. The insulating material 27 on the outside of the split metal sleeve 17 may be dispensed with, in which case the split metal sleeves 17 mechanically engage the wall of the core slots to give good heat conduction.

As shown in Figure 3, the longitudinal edges or lips of the split metal sleeve which constitute a slit to insert the winding therethrough are provided with a longitudinal shoe made of insulating material and bonded thereto. Closely spaced holes 19 may be provided along the marginal edge of the sleeve through which the insulating material of the longitudinal shoe may extend in order to mechanically anchor the longitudinal shoe firmly to the longitudinal edges of the split metal sleeve. The split metal sleeves are longer than the width of the magnetizable core and extend therebeyond and the extended ends 21 are provided with head shoes 23 made of insulating material. Closely spaced holes 22 may be provided around the end of the sleeves 21 in order that the insulating material may extend therethrough and aid in mechanically anchoring the head shoes 23 to the ends of the sleeve. The metal sleeves may be pre-fabricated with lip and head shoes made of insulating material and bonded thereto or the insulated shoes may be left off during the early stage of the process and later applied when the gap between the lips are closed by the insulating materials. Preferably, the longitudinal shoes 20 and the head shoes 23 are molded to the metal sleeve under pressure whereby a perfect fluid-tight bond is established between the metal and the insulating material. The longitudinal edges or lips 18 and the ends 21 of the metal sleeve may be somewhat roughened or rendered susceptible to receive the insulating material so that the insulating material may provide a more perfect bond thereto.

The split metal sleeves 19 either with or without the longitudinal shoes 20 and the head shoe 23 molded thereto, as the case may be, may be pushed endwise into the core slots 24 preparatory to mounting the coil sides of the winding elements in the sleeves. In mounting the coil sides 13 in the split metal sleeve, each individual wire is inserted through the open slots of the core and then through the slit between the longitudinal edges or lips 18 of the metal sleeve. The coil heads extend around the ends of the magnetizable core as shown in Figure 2. The space between the longitudinal shoes 20 is arranged to be bridged and sealed by additional insulating material 29 and the head shoes 23 on the ends of the metal sleeves 17 are arranged to be sealed and bonded to the insulating material covering the coil heads by means of additional insulating material 30 and 31. In our invention, although dipping or polymerizing in situ may be employed, we preferably inject the insulating material 29, 30 and 31 into position by the injecting arrangement shown in Figure 2, which comprises generally a bottom mold 32 suitably connected to the end rings 11 of the magnetizable core and a top mold 33 which engages the top end ring of the core. An injecting tube 36 extends upwardly through the bottom mold 32 and is arranged to have a plurality of injecting holes 37 which register with the core slots. Positioned above the injecting tube 36 and fitting in the stator core opening is a heater tube 39 which may contain heated liquid or any other heating means for heating the insulating material as it is injected into the coil slots. The bottom mold 32 is provided with a suitable filler material into which the coil head 15 may be nested or mounted. As the insulating material is fed through the injecting holes 37 into the core slots, the material flows downwardly and outwardly on top of the filler material 34. The insulating material on top of the filler material 34 is designated by the reference character 30 and is arranged to seal the head shoe 23 on the bottom end of the metal sleeve to the insulating material 26 which covers the bottom coil head 15. As more insulating material is injected through the injecting holes 37 into the coil core slots, the insulating material rises in the coil slots until it overflows out through an overflow duct 35 provided in the top mold 33. The insulating material which flows around the upper end of the magnetizable core 10 provides for sealing the shoes 23 on the top end of the split metal sleeves to the insulating material 25 which is provided on the top coil head. The magnetizable core 10 may be heated externally by a heater case 40 filled with a suitable heating fluid, whereby the temperature may be maintained at a suitable value throughout the stage of injecting the insulating material into the magnetizable core and about the winding elements. After the insulating material has set the top and bottom molds, the injecting tube 36 and the heater tube 39 are removed, which leaves the winding elements completely enclosed in an envelope comprising the split sleeves and the insulating material.

By employing split metal sleeves 17 we are able to maintain maximum slot space for the winding elements, while at the same time maintaining good heat conduction as well as rendering the winding elements fluid-proof. In our invention since the fluid cannot flow through the metal sleeves the only possible place for fluid to enter the winding elements would be along the bond between the longitudinal shoes 20 and the longitudinal edges of the metal sleeve and along the bond between the head shoes 23 and the end of the sleeves 21. It is noted in the drawing that the insulating longitudinal shoes and the head shoes extend a considerable distance down along the metal, thus providing a large surface area for making a good bond. Furthermore, the insulating material is made heavy or thick in this region which prevents any fluid from being transmitted therethrough. The applicants find that where the insulating material is made relatively thin, the fluid after a prolonged period of time, is transmitted through the insulating material. In our invention, the insulating material is made sufficiently heavy to prevent fluid from being transmitted therethrough, and by using split metal sleeves which have a thin wall section, we are also able to keep moisture from passing into the winding elements since metal does not permit the passage of fluid therethrough.

In our invention, the insulating material may be of any suitable type so long as it provides a good fluid-tight bond with the metal sleeve. The insulating material should preferably have the qualities of (1) low water absorption, (2) high insulation properties, (3) great resistance to chemicals including acids, alkalies, corrosives and gases (4) good tensile strength and (5) ease of application to the metallic sleeves and readiness of sealing.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. An envelope for a winding element having first and second end portions with an intermediate portion therebetween, said envelope comprising a first mass of insulating material covering the first end portion of the winding element, a second mass of insulating material covering the second end portion of the winding, and closure means for the intermediate portion of the winding element, said closure means including a split metal sleeve having a slit to receive the said intermediate portion of the winding element, said sleeve extending between the first and second masses of insulating material, and an additional mass of insulating material bridging the said slit and sealing the ends of the metal sleeve respectively with the first and second masses of insulating material.

2. In an electrical device having a magnetizable core with open slots and winding elements in said slots, the improvement of closure means for the portion of the winding elements in said slots, said improvement comprising a split metal sleeve for insertion in each slot and extending at least the length of said slots, each of said sleeves having a slit to receive the winding elements, and a mass of insulating material bridging and sealing the slits of the said sleeves.

3. In an electrical device having a magnetizable core with open slots and winding elements having coil sides in the slots and coil heads extending around the ends of the core, the improvement of an envelope for the winding elements, said envelope comprising a first and second mass of insulating material covering respectively the coil heads, and closure means in each of the slots for the coil sides, each of said closure means including a split metal sleeve having a slit to receive the coil sides, said sleeves extending between the first and second masses of insulating material, and an additional mass of insulating material bridging the said slits and sealing the ends of the metal sleeve respectively with the first and second masses of insulating material.

4. In an electrical device having a magnetizable core with open slots and winding elements having coil sides in the slots and coil heads extending around the ends of the core, the process for providing an envelope around the winding elements comprising the steps of providing first and second masses of insulating material respectively around the coil heads, providing a split metal sleeve with a slit for each of the slots and inserting the sleeves in said slots with the slits registering with the open slots, inserting the coil sides into the split sleeves through the open slots and the registering slits, and applying insulating material into the slits of the metal sleeves and between the ends of the metal sleeves and the first and second masses of insulating material, respectively.

5. In an envelope for a winding element, the improvement of closure means for a portion of the winding element, said improvement comprising a split tubular metal sleeve having a slit to receive said portion of the winding element, and a mass of insulating material bridging and sealing the said slit, said metal sleeve having its inside surface coated with an insulating vitreous material.

6. In a magnetizable laminated core having ends with at least an open slot extending therebetween, at least a winding element having head portions with a side portion therebetween and said side portion positioned in said slot with said head portions at the ends of the core, closure means for the side portion comprising a split metal sleeve enveloping said coil side in the slot and extending at least the full length of the slot and having a cross-sectional outline substantially conforming to the general contour of the side wall of the slot, and a mass of insulating material bridging and sealing the slit of the sleeve and extending to the coil heads and enveloping and sealing said heads.

7. In a magnetizable laminated core having at least an open slot therein and a winding element in said slot, the provision of a split metal sleeve extending at least the length of the slot and having a cross-sectional outline substantially conforming to the general contour of the side wall of the slot.

8. In a magnetizable laminated core having at least an open slot therein and a winding element in said slot, the provision of a split metal sleeve extending at least the length of the slot and having a cross-sectional outline substantially conforming to the general contour of the side wall of the slot, said metal sleeve having an electrical insulating coating on at least one side thereof.

9. In a magnetizable laminated core having at least an open slot therein and a winding element in said slot, the provision of a split metal sleeve extending at least the length of the slot and having a cross-sectional outline substantially conforming to the general contour of the side wall of the slot, said metal sleeves being insulated from said windings by a layer of insulating material positioned therebetween.

FRANK J. SIGMUND.
WILLIAM S. HLAVIN.

REFERENCES CITED

The following references are of record in the file of this patent:

UNITED STATES PATENTS

| Number | Name | Date |
| --- | --- | --- |
| 1,387,389 | Haverli et al. | Aug. 9, 1921 |
| 1,732,607 | Dominguez | Aug. 6, 1929 |
| 403,262 | Garland | May 14, 1889 |

FOREIGN PATENTS

| Number | Country | Date |
| --- | --- | --- |
| 25,834 | Great Britain | 1907 |
| 559,649 | Germany | June 1, 1934 |